United States Patent
Kerebel et al.

(10) Patent No.: US 9,560,401 B2
(45) Date of Patent: Jan. 31, 2017

(54) METHOD OF TRANSMITTING AT LEAST ONE CONTENT REPRESENTATIVE OF A SERVICE, FROM A SERVER TO A TERMINAL, AND ASSOCIATED DEVICE AND COMPUTER PROGRAM PRODUCT

(75) Inventors: Ronan Kerebel, Saint Aubin du Cormier (FR); Elouan Le Coq, Rennes (FR); Jean-Claude Dufourd, Le Kremlin Bicetre (FR); Cédric Gegout, Rennes (FR)

(73) Assignee: Streamezzo, Rennes (FR)

( * ) Notice: Subject to any disclaimer, the term of this patent is extended or adjusted under 35 U.S.C. 154(b) by 1996 days.

(21) Appl. No.: 12/525,638

(22) PCT Filed: Jan. 25, 2008

(86) PCT No.: PCT/EP2008/050906
§ 371 (c)(1),
(2), (4) Date: Oct. 8, 2009

(87) PCT Pub. No.: WO2008/095800
PCT Pub. Date: Aug. 14, 2008

(65) Prior Publication Data
US 2010/0030852 A1    Feb. 4, 2010

(30) Foreign Application Priority Data
Feb. 2, 2007  (FR) .................... 07 00765

(51) Int. Cl.
*G06F 15/16*   (2006.01)
*H04N 21/258*  (2011.01)
(Continued)

(52) U.S. Cl.
CPC .. *H04N 21/25841* (2013.01); *H04L 29/06027* (2013.01); *H04N 19/25* (2014.11);
(Continued)

(58) Field of Classification Search
CPC ............... H04N 21/8543; H04N 21/85406; H04N 21/23412; H04N 19/25; H04L 29/06027; H04L 67/02
(Continued)

(56) References Cited

U.S. PATENT DOCUMENTS

| | | | | |
|---|---|---|---|---|
| 6,044,397 | A * | 3/2000 | Eleftheriadis | H04N 7/52 375/E7.003 |
| 6,456,857 | B1 * | 9/2002 | Bos | H04M 1/725 370/466 |

(Continued)

OTHER PUBLICATIONS

International Search Report from International Application No. PCT/EP2008/050906 dated Apr. 17, 2008.
(Continued)

*Primary Examiner* — Oleg Survillo
(74) *Attorney, Agent, or Firm* — Zilka-Kotab, PC (57) ABSTRACT

A method is provided for transmitting at least one content representative of a service, from a server to a terminal. Such a method includes a preliminary preparation phase of the service and a phase of transmitting. The preliminary preparation phase includes a step of providing the service by a creator, in the form of a textual description comprising a text portion and at least one program instruction, and a step of translating, in a compilation environment, the textual description of the service into a service program, including executable instructions. The phase of transmitting the content to the terminal, includes, on receipt of a request by the terminal, a step of executing the service program on the server, delivering the content in the form of binary data, and a step of transmitting the binary data to the terminal.

18 Claims, 3 Drawing Sheets

(51) Int. Cl.
  H04L 29/06    (2006.01)
  H04N 21/854   (2011.01)
  H04N 19/25    (2014.01)
  H04N 21/234   (2011.01)
  H04N 21/2343  (2011.01)
  H04N 21/235   (2011.01)
  H04N 21/414   (2011.01)
  H04N 21/8543  (2011.01)
  H04N 21/858   (2011.01)
  H04L 29/08    (2006.01)

(52) U.S. Cl.
  CPC ..... *H04N 21/2343* (2013.01); *H04N 21/2353* (2013.01); *H04N 21/23412* (2013.01); *H04N 21/234318* (2013.01); *H04N 21/25825* (2013.01); *H04N 21/25833* (2013.01); *H04N 21/25858* (2013.01); *H04N 21/41407* (2013.01); *H04N 21/8543* (2013.01); *H04N 21/8586* (2013.01); *H04N 21/85406* (2013.01); *H04L 67/02* (2013.01)

(58) Field of Classification Search
  USPC .......................................................... 709/203
  See application file for complete search history.

(56) References Cited

U.S. PATENT DOCUMENTS

| | | | | |
|---|---|---|---|---|
| 7,099,687 | B1* | 8/2006 | Makela | H04W 28/24 370/230 |
| 7,216,288 | B2* | 5/2007 | Westerink et al. | 715/201 |
| 7,221,801 | B2* | 5/2007 | Jang et al. | 382/232 |
| 7,251,277 | B2* | 7/2007 | Luken | 375/240.08 |
| 7,877,460 | B1* | 1/2011 | Brouwer et al. | 709/217 |
| 2002/0095433 | A1* | 7/2002 | Inohara et al. | 707/200 |
| 2003/0018783 | A1* | 1/2003 | Bos | G06F 9/5044 709/226 |
| 2004/0054653 | A1* | 3/2004 | Dufourd et al. | 707/1 |
| 2004/0109502 | A1* | 6/2004 | Luken | 375/240.08 |
| 2004/0123238 | A1* | 6/2004 | Hefetz et al. | 715/513 |
| 2005/0149558 | A1* | 7/2005 | Zhuk | G06F 8/10 |
| 2005/0234844 | A1* | 10/2005 | Ivanov | 707/1 |
| 2006/0041674 | A1* | 2/2006 | Reme | 709/231 |
| 2006/0179079 | A1* | 8/2006 | Kolehmainen | G06F 9/4862 |
| 2007/0294674 | A1* | 12/2007 | Marilly | H04N 21/23412 717/136 |
| 2008/0052396 | A1* | 2/2008 | Tell | H04L 67/16 709/226 |
| 2009/0055473 | A1* | 2/2009 | Synnergren | 709/204 |
| 2009/0167769 | A1* | 7/2009 | Gouesbet et al. | 345/473 |
| 2009/0305743 | A1* | 12/2009 | Gouesbet et al. | 455/566 |
| 2010/0030852 | A1* | 2/2010 | Kerebel et al. | 709/203 |

OTHER PUBLICATIONS

K. Kim, I. Lee and M. Ki, "Interactive Contents Authoring System based on XMT and BIFS," Multimedia 2002, Dec. 1-6, 2002, pp. 275-278.

C. Liu, "Data Flow Analysis and Testing of JSP-Based Web Applications," Information and Software Technology, 2006, pp. 1137-1147.

Chinese Office Action from Application No. 200880003829.X dated May 6, 2011 (English Translation only).

Chinese Office Action from Application No. 200880003829.X dated Sep. 28, 2010.

International Search Report for corresponding International Application No. PCT/EP2008/050906, filed Jan. 25, 2008.

Preliminary Report on Patentability and Written Opinion of the International Searching Authority for corresponding International Application No. PCT/EP2008/050906, filed Jan. 25, 2008.

Office Action from Chinese Patent Application No. 200880003820.X, dated Feb. 13, 2012, 7 pages.

* cited by examiner

METHOD OF TRANSMITTING AT LEAST ONE CONTENT REPRESENTATIVE OF A SERVICE, FROM A SERVER TO A TERMINAL, AND ASSOCIATED DEVICE AND COMPUTER PROGRAM PRODUCT

CROSS-REFERENCE TO RELATED APPLICATIONS

This Application is a Section 371 National Stage Application of International Application No. PCT/EP2008/050906, filed Jan. 25, 2008 and published as WO 2008/095800 on Aug. 14, 2008, not in English.

STATEMENT REGARDING FEDERALLY SPONSORED RESEARCH OR DEVELOPMENT

None.

THE NAMES OF PARTIES TO A JOINT RESEARCH AGREEMENT

None.

FIELD OF THE DISCLOSURE

The field of the disclosure is that of creating and transmitting multimedia content on a radiocommunication terminal, e.g., of the wireless telephone, PDA ("Personal Digital Assistant"), laptop computer type, etc.

A multimedia content is understood to mean, in particular, a set consisting of at least one animated graphic scene, which is also called a multimedia scene, and a series of commands enabling this scene to be played from one state to another. A multimedia scene corresponds, in particular, to the arrangement of a set of graphic objects in time and space, with which the user of the radiocommunication terminal can interact. This arrangement is described using vocabulary dependent on the scene description format. The scene vocabulary can be used in textual descriptions or in binary descriptions. In an XML-format textual description, the vocabulary words are the names of the elements used in the description. In a binary description, the words are the binary objects, used in the description.

The disclosure finds applications in all fields requiring a representation of the signals in the form of a space-time arrangement of graphic objects with interactivity.

The disclosure applies in particular to already known graphic scene description formats such as MPEG-4/BIFS ("Binary Format Scene"), SVG ("Scalable Vector Graphics"), SMIL ("Synchronized Multimedia Integration Language"), XHTML ("Extensible HyperText Markup Language"), etc.

BACKGROUND OF THE DISCLOSURE

Several devices currently exist for converting a textual multimedia scene description into content viewable by a user, among which are included:
Encoder-type devices which construct an equivalent binary content from a textual description,
Compiler-type devices which, from an assemblage of symbols, key words and rules (i.e., a computer language), make it possible to describe instructions to an execution environment which will construct an equivalent binary content,
Dynamic publishing engine-type devices which, using documents, interpret same in order to send content to a user.

Among the above-mentioned techniques, the most widely used is of the Encoder type. It does nothing more than to translate a set of multimedia instructions expressed in one format F1 into another format F2, which format F2 being generally more compressed than the first format F1.

One disadvantage of this technique lies in the fact that it does not enable the author to translate a set of graphic scenes into an executable code which will generate content according to the execution context. Therefore, this technique is not suited to generating dynamic content.

The most advanced technique defines how a dynamic publishing engine device interprets a document and constructs content intended to be broadcasted directly, i.e., in the format used for the scene description portion of the initial document. In the following examples, such a format, for example, is an XML or HTML text format exempt of the scripts to be executed on the server.

For example, Server Pages technologies (e.g., Active Server Pages™ or XML Server Pages) supply a server script development environment for creating Web server applications, which are both dynamic and interactive. The author can associate XML or HTML pages and the script commands for creating interactive Web pages or powerful Web-based applications. The majority of active page technologies (ASP, PHP etc.) are based on an interpreted code, the execution of which requires many resources in order to provide the answer.

Java Server Pages (JSP) technologies are differentiated by the fact that they are compiled only in the case where the Java Server Pages script has been updated. These JSP technologies are faster running than completely interpreted technologies.

However, in every instance, the document is interpreted at the moment of the user request, which makes a priori validation of all of the content difficult.

In addition, these techniques do not enable a priori validation of a "dynamic service," i.e., a set of dynamic content and navigation rules which connect said dynamic contents, and even less the operation of the content generating system as a whole.

Furthermore, interpreting at the moment of the user request makes any management of the media used in the service difficult or impossible, especially if the references to these media are created by script commands.

Finally, another disadvantage of JSP technologies is due to the fact that all of the vocabulary words of the description of the service must be words of the final language. It is not possible to make extensions, in the description of the service, which would not be compatible with the final language.

Application design methods also exist which are based solely on a programming language. It is actually possible to include a series of modules in a computer program the functions of which encompass:
creation of a multimedia scene in memory;
management of the interactivity, animation and rendering of said scene;
dialog with a server and interpretation of the responses of said server.

These approaches enable any type of service to be created, including a very complex mixture of data presentation and computations, which may be required in a game-type application.

On the other hand, these approaches are extremely costly in terms of development time and are poorly suited to broadcasting over a broad range of different terminals, because each application must be tested on each type of terminal.

Finally, techniques based on compiler-type devices only enable a executable code to be generated, the computer languages used at the input often describe basic instructions interpreted and executed by the execution environment and not content-creating rules, and cannot therefore be used within the framework of creating dynamic content.

SUMMARY

An aspect of the present disclosure relates to a method of transmitting at least one content representative of a service, from a server to a terminal.

According to an embodiment of the invention, such a method includes:
a preliminary preparation phase of said service, comprising:
  a step of providing said service by a creator, in the form of a textual description comprising a text portion and at least one program instruction;
  a step of translating, in a compilation environment, said textual description of said service into a service program, comprising executable instructions;
a phase of transmitting said content to said terminal, on receipt of a request by same, comprising:
  a step of executing said service program on said server, delivering said content in the form of binary data;
  a step of transmitting said binary data to said terminal.

In this way, the method according to an embodiment of the invention makes it possible to transmit binary content representative of a service to a terminal, in response to a request by same, while having carried out a service preparation phase in advance.

This preparation phase first consists in creating the service in question, by means of a service creator, and in providing this service to the transmitting server.

This provisioning step consists in making a service available to the transmitting server which is either created "internally", within the server itself, in a service design environment, or created in a design environment external to the server, such as a computer or server dedicated specifically to the creation of services.

In the first case, the provisioning step consists in transmitting a service within a single server, and, in the second case, this step consists in providing the server with a service which was created "externally" with regard to this server.

The created service is advantageously in the form of a textual description comprising a text portion and at least one program instruction.

Once the service has thus been created and made available to the server, it undergoes a translation step, within a so-called compilation environment. This translation step consists in converting the textual description of the service into a service program, comprising executable instructions.

This translation step likewise occurs in the transmitting server.

This phase of preparing the service, prior to transmission, enables a considerable time gain in processing the response to the request by the terminal, the service being already pre-processed and "ready" to be executed in the form of a service program.

In addition, the creation of this service program enables binary data to be generated dynamically, in the next execution step, without passing through a language such as XML, thereby making it possible to significantly economize on the memory required for transmitting content representative of a service.

The phase of transmitting the content representative of a service itself includes several steps, which are initiated on receipt of a request coming from the terminal receiving the content.

The first step first consists in executing the service program on the server, thereby delivering or generating content in the form of binary data.

This binary data thus generated is then transmitted to the terminal in response to the request by same.

Said step of executing said service program on said server preferably includes a sub-step of identifying an execution context associated with said terminal, providing at least one characteristic of said terminal, which is taken into account for generating said binary data transmitted to said terminal.

In this way, the transmitting server will take account of certain characteristics of the terminal, which are contained, for example, in the request issued by same, in order to create an execution environment for the service program, and to thereby adapt the execution to the terminal in question. This step of identifying an execution context thus makes it possible to optimize the service program execution step, while taking account of characteristics of the terminal.

The server will likewise take into consideration characteristics related to the service in order to create this execution context.

Said translation and execution steps advantageously implement a single programming interface, making use of scene vocabulary used in said textual description of said service.

Thus, the translation step will in particular determine whether the textual description of the service is consistent with a scene vocabulary. Thus, the terms belonging to this vocabulary will be used to translate the text into instructions, by means of a programming interface. For example, the translation step will use a dictionary comprising the terms of the scene vocabulary and the corresponding instructions.

In addition, the service program is also consistent with this scene vocabulary. Thus, the service program execution step will use this same programming interface, making use of the same scene vocabulary, in order to interpret and execute the instructions.

According to one particular aspect of the method according to an embodiment of the invention, said scene vocabulary includes elements referring to at least one type of media.

Thus, the scene vocabulary enables reference to be made to audio or video.

According to another aspect of the method according to an embodiment of the invention, at least one of said program instructions relates to at least one multimedia object.

For example, the program instructions can enable creation of a video object (e.g., a "clip"), or an audio object (e.g., a musical interlude or "jingle").

According to another particular embodiment, at least one of said program instructions relates to at least one address pointing to at least one multimedia object or other content.

Thus, the program instructions make it possible to make use of multimedia (audio, video, . . . ) objects or content which are not directly described in the service, but which are accessible by means of addresses, e.g., a "URL".

Said transmission step advantageously includes a step of multiplexing said binary data of said content, at the server output, with binary data generated independently of said content.

Thus, the method according to an embodiment of the invention enables the server to transmit, to the terminal, content representative of a service, into which other data has been integrated, e.g., audio or video data. This binary data is multiplexed with service data in order to form a "complete" content to be transmitted to the terminal.

According to yet another particular embodiment, said transmission and execution steps are carried out in parallel so that said binary data is transmitted to the terminal as it is being generated.

Thus, parallelization of these transmission and execution steps enables continuous-mode transmission, which is also called "streaming," of the content representative of the service, as the binary data is being generated on the server. This makes it possible, in particular, to begin transmitting content to the terminal even if the entire service program has not yet been executed on the server.

Said preliminary preparation phase of said service advantageously includes a step of controlling said scene vocabulary, prior to said translation step, thereby verifying that said text portion corresponds to elements of said scene vocabulary.

In this way, this control step will make it possible to validate whether the service has been created while respecting the chosen scene vocabulary, and will enable facilitation of the translation of the textual description of the service, either by eliminating the elements of the description which are not consistent with the vocabulary, or by correcting same.

In addition, according to one particular embodiment, said preliminary preparation phase of said service includes a step of controlling said program instructions, thereby verifying whether said program instruction or instructions correspond(s) to computer program instructions which are directly convertible into binary code sequences capable of being executed by said server.

This control step makes it possible to verify whether the program instructions present in the description of the service are consistent with server-executable instructions. There again, this step makes the translation step easier.

Said preliminary preparation phase of said service advantageously includes a step of converting said text portion into program instructions using said same programming interface.

Thus, this conversion step uses the same programming interface as that used in the translation and execution steps.

Finally, according to yet another particular embodiment, said preliminary preparation phase of said service includes a consistency control step, which verifies whether said program instructions of said description are consistent with those resulting from said conversion step.

In this way, the method can verify whether the instructions do not make use of elements not present in the textual description, for example. In addition, this step can verify whether the conversion step has generated instructions consistent with the instructions present upon creation of the service.

An embodiment of the invention likewise relates to a device for transmitting at least one content representative of a service from a server to a terminal.

According to an embodiment of the invention, such a device includes:
preliminary preparation means of said service, comprising:
means of receiving said service provided by a creator in the form of a textual description comprising a text portion and at least one program instruction;
means of translating, in a compilation environment, said textual description of said service into a service program, comprising executable instructions;
means of transmitting said content to said terminal, on receipt of a request by same, comprising:
means of executing said service program on said server delivering said content in the form of binary data;
means of transmitting said binary data to said terminal.

In particular, such a device is capable of implementing the transmission method according to an embodiment of the invention, as described previously.

Such a device, for example, is a service server capable of transmitting content representative of a service to a terminal.

An embodiment of the invention further relates to a computer program product which can be downloaded from a communication network and/or recorded on a machine-readable medium and/or executed by a processor, characterized in that it includes program code instructions for implementing the transmission method as described previously.

BRIEF DESCRIPTION OF THE DRAWINGS

Other characteristics and advantages will become more apparent upon reading the following description of one particular embodiment, given for non-limiting and illustrative purposes, and from the appended drawings, in which.

DETAILED DESCRIPTION OF ILLUSTRATIVE EMBODIMENTS

1. General Principle of an Embodiment of the Invention

The general principle of an embodiment of the invention consists in describing a method of converting a description of multimedia scenes into a system code, the execution of this system code then generating binary multimedia data in a content also referred to as a dynamic service.

The method according to an embodiment of the invention consists in providing an author with tools for generating an executable code which can be understood directly by a computer system on the basis of a scene description. The execution of this code will then produce a set of contents which will depend on the execution context of said code, i.e., of both the service and the client requesting to use this service. These contents are referred to as dynamic.

Figure 3:
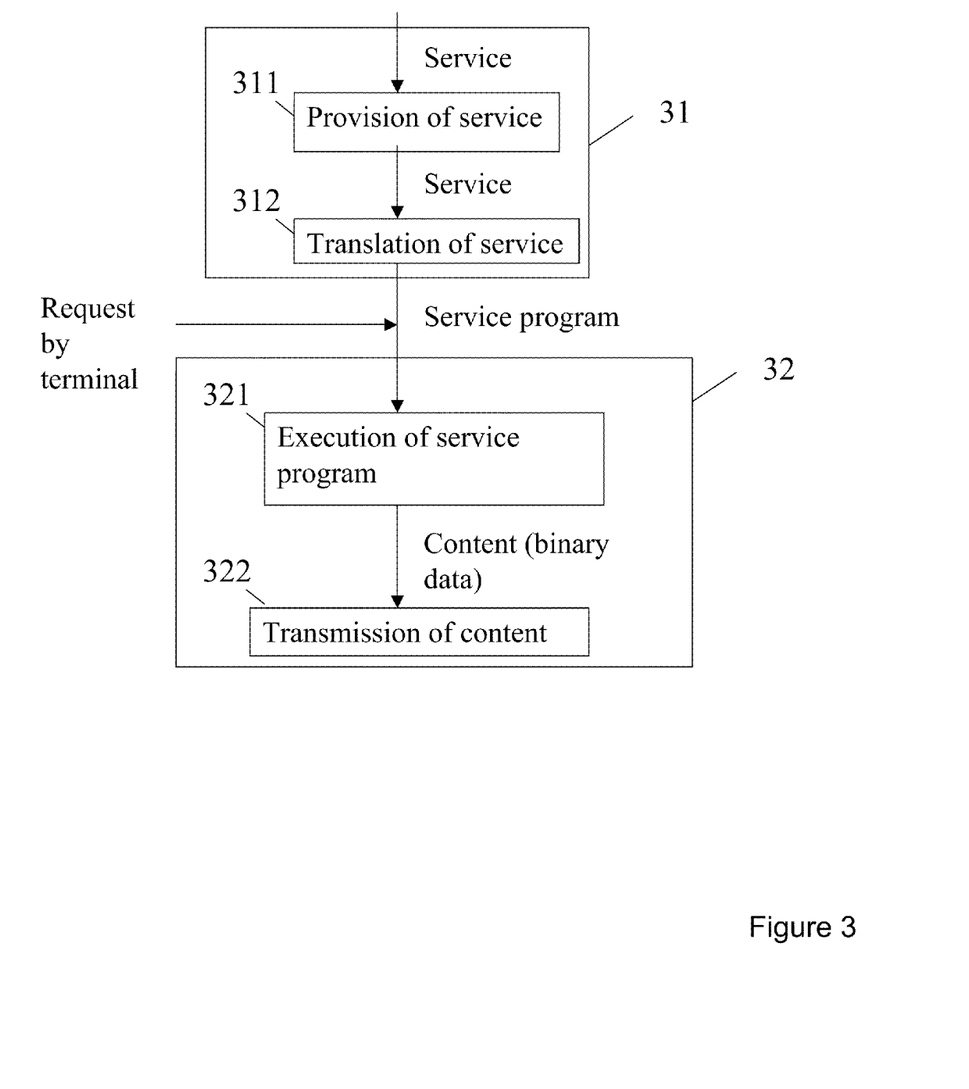
FIG. 3 shows the various steps of the method according to one particular embodiment of the invention.

The various steps of the method according to one particular embodiment of the invention are introduced in relation to FIG. 3.

The various steps can be grouped into 2 phases:
a preparation phase 31;
a transmission phase 32.

The first preparation phase 31 includes two steps, which enable a service program to be generated.

The first step 311 of providing a service consists in designing and creating a service, which is intended for use by a terminal having requested same. This step can be carried out internally within the transmitting server, or externally.

In both cases, a service, which is represented in the form of a textual description, comprising a text portion and at least one program instruction, is made available to the server for the second step 312 of translating this service into a service program.

This step consists in converting the textual description of the service into instructions executable by the server, in the form of a service program.

The second transmission phase 32 likewise includes two steps which, in response to a request by a terminal, make it possible to provide a binary content and to transmit it to the terminal.

The first step 321 of executing the service program consists in converting the service program into binary data while executing it. This binary data forms the content to be transmitted to the terminal in a second transmission step 322.

Figure 1:
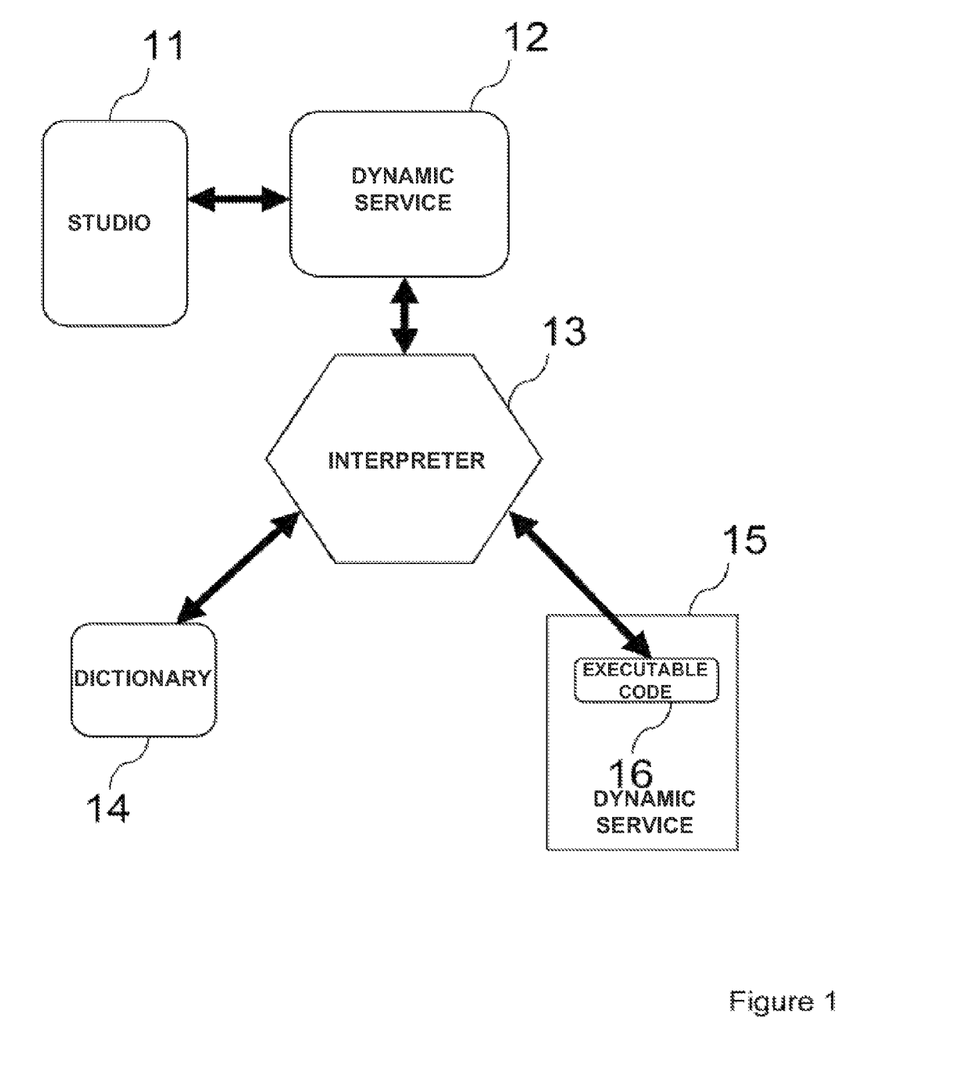
FIG. 1 shows an exemplary design of a dynamic service according to one embodiment of the invention.

The step of designing a service, according to one particular embodiment of the invention, is presented hereinbelow in relation to FIG. 1.

Generally speaking, an authoring tool called Studio 11 creates and/or acts on a textual description of a dynamic service 12. The description of said dynamic service 12 is then compiled by an Interpreter 13, which is based on a Dictionary 14 for matching up the elements stated in the description of dynamic services and the corresponding program instructions. The result of the compilation is a dynamic service 15 in executable code 16.

Figure 2:
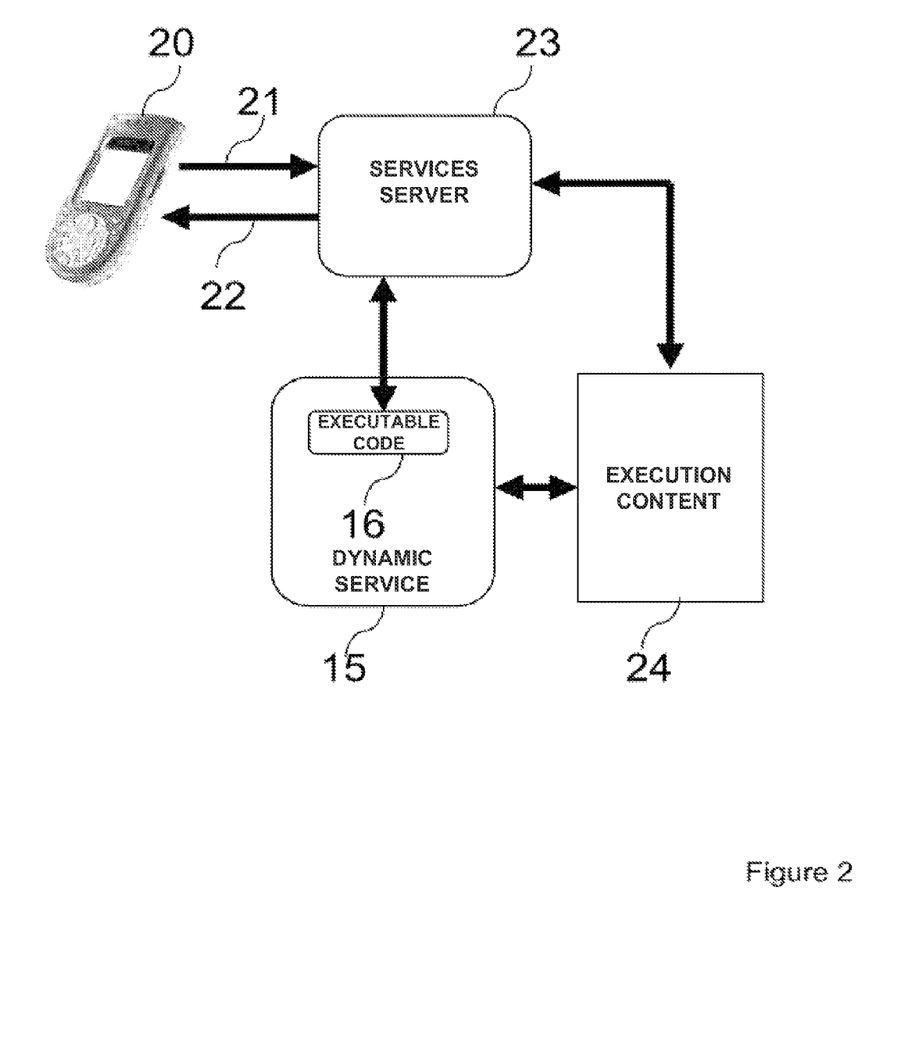
FIG. 2 shows an example of transmitting a dynamic service designed according to the example of FIG. 1, according to one particular embodiment of the invention.

FIG. 2 shows the step of transmitting a dynamic service designed as described previously, according to one particular embodiment of the invention. The executable code 16 of the dynamic service 15 is placed in an environment of the Services server 23. The terminal 20 sends a content request 21 to the Service server 23. The Service server 23 creates an execution context 24 for the client and the requested service. The executable code 16 of the dynamic service 15 is executed within this execution context 24 in order to generate the response 22, which is then transmitted to the terminal 20 by the server 23.

2. Designing a Dynamic Service 2.1 First Embodiment

The various steps of designing a dynamic service, according to a first embodiment of the invention, are introduced hereinbelow in relation to FIG. 1.

Owing to the Studio tool 11, the author will make multimedia presentations within which the graphic objects have dynamic behaviors.

The author also expresses navigation rules enabling a user to navigate between the various presentations.

All of the dynamic contents and the navigation rules interconnecting them are hereinafter designated by the term dynamic service.

In the design step, the form of the description of the dynamic service 12 is a textual form, wherein program instructions are inserted into a declarative textual description using a LASeR-type vocabulary.

An Interpreter tool 13, which, in particular, is responsible for the binary generation of the textual description of the dynamic contents, is input with the graphic elements, graphic arrangements and navigation rules expressed by the author. This Interpreter 13 constructs a set of executable codes 16, which are also called binary data, on the basis of a Dictionary of instructions and rules 14, which is also called a vocabulary, which makes it possible to:

translate a basic graphic element into a set of basic commands interpreted and executed by the execution environment of the service Server 23 of FIG. 2, apply rules for verifying the consistency of the description at the semantic level, which is also called a vocabulary control step. It should be noted that these verifications are not possible with syntactical and non-textual descriptions, e.g., those of the DTD type ("Document Type Definition"), which make it possible to verify whether a XML ("Extensible Markup Language") document is consistent with a given syntax, or of the XSD type ("XML Schema Definition"), which make it possible to verify whether an XML document is consistent with a given syntax, apply other content production rules, e.g., such as rules for managing media synchronized with the scene description, thereby enabling optimization of the user experience.

The set of executable codes is then inserted into the execution environment of the service Server 23.

2.2 Second Embodiment

In one particular mode of implementing an embodiment of the invention, the dynamic service textual description 12 is subjected to a text editing step by a service designer desiring to overcome the limitations associated with the authoring tool Studio 11.

2.3 Third Embodiment

In another mode of implementing an embodiment of the invention, the dynamic service textual description 12 consists of a LASeR ML ("LASeR Markup Language") description, i.e., the statement of the content of an interactive multimedia scene in LASeR format, with LASeR scene elements and attributes and LASeR scene modification commands.

In this description, Java program instructions are inserted, as described below in one example:

```
<%@ page import="dynamic.DynamicProperties"%>
<saf:SAFSession xmlns:ev="http://www.w3.org/2001/xml-events"
    xmlns:saf="urn:mpeg:mpeg4:SAF:2005"
xmlns:xlink="http://www.w3.org/1999/xlink"
xmlns:lsr="urn:mpeg:mpeg4:LASeR:2005"
xmlns="http://www.w3.org/2000/svg" >
    <saf:sceneHeader>
    <lsr:LASeRHeader coordBits="19" resolution="1" profile="full">
    <%
    dynamic.DynamicProperties dp =
    new dynamic.DynamicProperties( );
    %>
    </lsr:LASeRHeader>
    </saf:sceneHeader>
    <saf:sceneUnit time="0">
    <lsr:NewScene>
    <svg height="100%" width="100%" viewBox="0 0 176 208">
    <rect height="208" x="0" width="176"
    fill="<%= dp.getBgColor( ) %>" y="0"/>
    <polyline points="..." stroke="rgb(0,0,0)" fill="rgb(92,140,250)"/>
    </svg>
    </lsr:NewScene>
    </saf:sceneUnit>
    <saf:endOfSAFSession/>
</saf:SAFSession>
```

These Java instructions can refer to:

named elements of the LASeR description of the scene, i.e., elements having an "id" attribute, the value of which is the name of the element in the form of a character string;

elements encompassing the location where said Java instructions are inserted;

methods belonging to a library of specific functions enabling LASeR elements to be created, so as to be capable of creating attributes or elements within these instructions and of inserting them at any relevant location of the scene;

methods belonging to a library of generic functions useful for designing dynamic multimedia services on a variety of terminals, including:

recovery of resources from remote servers (encapsulated HTTP client), handling of resources stored in cache memory (database), resizing/transcoding of images on said service server, getting information about the terminal by decoding terminal capacity information.

methods belonging to any library specific to the needs of a particular service, a library which will then have to be present in the execution environment of the service.

In this description, "<%" and "%>" define program instruction regions. The first region corresponds to package imports containing all required libraries, the second one creates an object enabling properties to be obtained, and the third one examines the background color.

In this description, an attribute is described in XML, and the value thereof is defined in program instructions (in Java here).

In particular, this enables the author to freely define the elements, attributes and contents in one or the other of the formalisms, or even to define them partially in one formalism and to complete them in another.

For example, the description extract below implements a reference to an element encompassing a program instruction:

```
<lsr:Insert>
  <text DEF="text" fill="rgb(0,0,0)">
  <% currentText.setString("toto"); %>
  </text>
</lsr:Insert>
```

3. Examples of Interpreter Tools According to Various Particular Embodiments of the Invention In a first possible mode of implementing an embodiment of the invention, the Interpreter tool 13 consists of:

an XML parser which creates a DOM ("Document Object Model") representation of the LASeR portion of the scene;

a Java pre-parser, which isolates and analyzes the program instruction portions in the service description;

a conversion operation which analyzes the DOM representation of the LASeR portion of the scene and translates each attribute and each element into a series of program instructions;

a step for merging the translated program instructions of the LASeR description and program instructions possibly added to the service description by the designer or the author;

a compilation of the program instructions and editing of the links in order to obtain the executable code 16 for the dynamic service 15. The associated libraries implement the scene element creation interfaces, the request interfaces, as well as the other interfaces specifically required for the service being designed.

In one preferred mode of implementing an embodiment of the invention, the Interpreter tool 13 consists of:

a so-called "on-the-fly" XML parser or SAX parser ("Simple API for XML"), which generates events;

an interpreter which analyzes said events and translates same into a series of program instructions generating each attribute and each element;

a step of merging the translated program instructions of the LASeR description and program instructions possibly added to the service description by the designer or the author;

a compilation of the program instructions and editing of the links in order to obtain the executable code 16 for said dynamic service 15. The associated libraries implement the scene element creation interfaces, the request interfaces, as well as the other interfaces specifically required for the service being designed.

4. Transmission of a Dynamic Service

The steps of transmitting a dynamic service designed as previously described, according to one embodiment of the invention, will now be introduced in relation to FIG. 2.

The terminal 20 requests content from a service Server 23 following interaction with a user who generates a request 21.

The service Server 23 selects the execution environment 24 and executes the executable code 16, i.e., the various instructions contained in this code.

These various instructions make it possible, in particular, to take account of the following various parameters:

a service logic, i.e., a logic corresponding to the sequence specific to a service;

a management logic of the client terminal 20 type, with possible adaptation of the content of the scene description based on the characteristics of said terminal 20;

a logic for managing the external resources required by said service, such as access to external databases;

a logic for managing the media used by said service, e.g., such as compliance with a graphic charter, requiring the use of visual or audible logos;

These various parameters can be taken into account in a variable order, based on the service, with, in particular, account being taken, on several occasions during the execution step, of a single parameter, based on the account taken of the previous parameters.

Therefore, the execution step follows a logic for binary generation of the scene description resulting from the account taken of the various logics above.

The server then sends content to the terminal 20, which describes the space-time arrangement of the graphic objects, which constitutes the response 22. All of these steps are then repeated as many times as necessary in order to respond to the successive requests by the user.

In one particular mode of implementing the service Server 23, a multiplexing phase follows the binary generation phase.

Over the course of the service lifetime, a set of binary scene description packets are generated, and a set of packets containing media frames, which are generally audio or video, are sent via a single communication channel.

This multiplexing phase contains a step for scheduling the sending of the packets which were entrusted to the multiplexer, and then a step for interleaving the various types of packets in a manner optimal to the user experience.

The method, according to at least one embodiment of the invention, enables an author to validate a dynamic service, i.e., a set of dynamic contents and navigation rules which connect said dynamic contents, prior to deploying this service. This is then referred to as "a priori validation".

The method, according to at least one embodiment of the invention, likewise enables an author to ensure optimal operation of the executable code representing a dynamic service, by reducing the weight of the intermediate steps, and in particular by reducing the volume of the character strings to be processed in order to execute this service.

In addition, the method, according to at least one embodiment of the invention, makes it possible to obtain a gain in expressiveness in content creation, because the author of the service benefits from an integrated mechanism enabling same to simultaneously process the content presentation, the interpretation of the instructions executed within the execution environment and the generation of these contents in dynamic mode.

The method, according to at least one embodiment of the invention, enables a reduction in memory and the use of computing resources for the execution of a dynamic service by storing in memory and executing only the executable code generated. Contrary to conventional publishing engines, the interpreter of the documents in executable code is not required during execution.

According to at least one embodiment of the invention, the method advantageously enables the obtainment of a gain in the implementation of the publishing system: the use of a device which integrates a Compiler, an Encoder and a Publishing engine makes it possible to simplify the process of editing said content. This ensures that the author has an integrated environment, thereby enabling same to generate dynamic services in a single interface and to validate the complexity, consistency and operation of these services, without deployment on a publishing server platform.

According to at least one embodiment of the invention, the method likewise makes it possible to obtain compatibility with conventional execution environments, while being capable of generating an executable code which is compatible with any compatible execution environment (i.e., JAVA executable code on J2EE platform).

According to at least one embodiment of the invention, the method also makes it possible to add to the description extensions which are incompatible with the final language. These extensions are intended for optimizing the service or one of the phases of the service, and are deleted by the binary generation phase. This significant flexibility makes it possible to simply express information for the author which is useful in optimizing execution of the code generated during execution of the service: e.g., server cache instructions, factorization of a subset of scenes included in several other scenes.

According to at least one embodiment of the invention, the method makes it possible to implement fine-tuning of the media referenced by the service, owing to the systematic interpretation of all portions of the service, including the references to said media.

In addition, according to at least one embodiment of the invention, the method enables the number of detectable design errors to be increased during the design phase and therefore enables improved a priori validation of the services: during the phase of converting the textual description of the dynamic service into executable code, the two portions of the textual description, namely the scene description and the program instructions, are translated and merged into a single description, which enables static and global analysis of the links between said two portions, while, for the existing techniques, the only means of verifying these links is to execute a large number of content requests in the working environment.

Finally, the techniques used in the method according to at least one embodiment of the invention enable development costs to be reduced by not requiring any advanced programming skill to design the services. In addition, a generic renderer can be tested on each type of terminal irrespective of the number of services that will be used by this generic renderer.

Although the present disclosure has been described with reference to one or more examples, workers skilled in the art will recognize that changes may be made in form and detail without departing from the scope of the disclosure and/or the appended claims.

The invention claimed is:

1. A method, comprising:
translating, by a server, a textual description of a service, including a text portion and at least one program instruction, into a service program comprising computer executable instructions;
after performing the translating, receiving, by the server, a request from a terminal for the service;
responsive to the request:
identifying, by the server, at least one characteristic of the terminal, including management logic associated with the terminal,
identifying, by the server, a plurality of characteristics of the service, including logic configured to manage external resources required by the service and logic configured to manage media used by the service,
creating, by the server, an execution environment to include the identified at least one characteristic of the terminal and the plurality of characteristics of the service, and
executing, by the server, the service program within the execution environment, the executing causing content in the form of binary data to be generated; and
transmitting, by the server, the binary data generated from the execution of the service program to the terminal.

2. The method of claim 1, wherein the translating and the executing implement a single programming interface having scene vocabulary used in the textual description of the service.

3. The method of claim 2, wherein the scene vocabulary includes elements referring to at least one type of media.

4. The method of claim 2, further comprising controlling said scene vocabulary, prior to said translating, to verify that the text portion corresponds to elements of the scene vocabulary included in the single programming interface.

5. The method of claim 2, further comprising converting the text portion into the computer executable instructions using the single programming interface.

6. The method of claim 1, wherein at least one of the at least one program instruction relates to at least one multimedia object.

7. The method of claim 1, wherein the at least one program instruction relates to at least one address pointing to at least one multimedia content or other content.

8. The method of claim 1, further comprising multiplexing the binary data of the content, at an output of the server, with binary data generated independently of the content.

9. The method of claim 1, wherein the transmitting and the executing are carried out in parallel so that the binary data is transmitted to the terminal as it is being generated.

10. The method of claim 1, wherein the at least one characteristic of the terminal is contained in the request by the terminal.

11. The method of claim 1, wherein a dictionary of instructions and rules is utilized for translating the textual description of the service to the service program comprising the computer executable instructions.

12. The method of claim 1, wherein the management logic associated with the terminal includes management logic for a type of the terminal.

13. The method of claim 1, wherein creating the execution environment to include the identified at least one characteristic of the terminal and executing the service program within the execution environment allows for adaptation of the service described by the textual description based on at least one characteristic of the terminal.

14. The method of claim 1, wherein the logic configured to manage external resources required by the service includes logic configured to manage access to external databases.

15. The method of claim 1, wherein the logic configured to manage media used by the service includes logic configured to manage compliance with a graphic charter requiring the use of visual or audible logos.

16. The method of claim 1, wherein the service is a dynamic service, the text portion is multimedia presentations within which graphic objects have dynamic behaviors and the at least one program instruction is at least one navigation rule enabling navigation between the multimedia presentations.

17. A server including a processor for performing a method including:
   translating, by the server, a textual description of a service, including a text portion and at least one program instruction, into a service program comprising computer executable instructions;
   after performing the translating, receiving, by the server, a request from a terminal for the service;
   responsive to the request:
      identifying, by the server, at least one characteristic of the terminal, including management logic associated with the terminal,
      identifying, by the server, a plurality of characteristics of the service, including logic configured to manage external resources required by the service and logic configured to manage media used by the service,
      creating, by the server, an execution environment to include the identified at least one characteristic of the terminal and the plurality of characteristics of the service, and
      executing, by the server, the service program within the execution environment, the executing causing content in the form of binary data to be generated; and
   transmitting, by the server, the binary data generated from the execution of the service program to the terminal.

18. A computer program product recorded on a non-transitory machine-readable medium, wherein the computer program product includes program code instructions executable by a processor for implementing a method, comprising:
   translating, by a server, a textual description of a service, including a text portion and at least one program instruction, into a service program comprising computer executable instructions;
   after performing the translating, receiving, by the server, a request from a terminal for the service;
   responsive to the request:
      identifying, by the server, at least one characteristic of the terminal, including management logic associated with the terminal,
      identifying, by the server, a plurality of characteristics of the service, including logic configured to manage external resources required by the service and logic configured to manage media used by the service,
      creating, by the server, an execution environment to include the identified at least one characteristic of the terminal and the plurality of characteristics of the service, and
      executing, by the server, the service program within the execution environment, the executing causing content in the form of binary data to be generated; and
   transmitting, by the server, the binary data generated from the execution of the service program to the terminal.

* * * * *